(12) United States Patent
Henry

(10) Patent No.: US 10,981,734 B2
(45) Date of Patent: Apr. 20, 2021

(54) CONDUIT ACCESS

(71) Applicant: Drew P. Henry, Oroville, CA (US)

(72) Inventor: Drew P. Henry, Oroville, CA (US)

( * ) Notice: Subject to any disclaimer, the term of this patent is extended or adjusted under 35 U.S.C. 154(b) by 0 days.

(21) Appl. No.: 16/847,420

(22) Filed: Apr. 13, 2020

(65) Prior Publication Data

US 2020/0324983 A1 Oct. 15, 2020

Related U.S. Application Data

(60) Provisional application No. 62/832,345, filed on Apr. 11, 2019.

(51) Int. Cl.
| | | |
|---|---|---|
| *B65G 51/36* | (2006.01) | |
| *B65G 51/30* | (2006.01) | |
| *B65G 51/08* | (2006.01) | |
| *B65G 51/28* | (2006.01) | |
| *F16L 55/10* | (2006.01) | |

(52) U.S. Cl.
CPC ............. *B65G 51/30* (2013.01); *B65G 51/08* (2013.01); *B65G 51/28* (2013.01); *F16L 55/1018* (2013.01); *B65G 2203/042* (2013.01)

(58) Field of Classification Search
CPC ........ B65G 51/18; B65G 51/36; B65G 53/52; B65G 53/66; B65G 2203/042; F16L 55/1018; F16L 45/00
USPC ..... 406/29, 31, 36, 176, 177, 178, 179, 180, 406/198
See application file for complete search history.

(56) References Cited

U.S. PATENT DOCUMENTS

| | | | | |
|---|---|---|---|---|
| 3,118,561 A | * | 1/1964 | Klaus ................. | F16L 55/1018 220/324 |
| 3,349,947 A | * | 10/1967 | Zumwalt ............. | F16L 55/1018 220/327 |
| 3,986,590 A | * | 10/1976 | Lapidus ................ | B65G 51/04 193/32 |
| 4,078,498 A | * | 3/1978 | Futer ..................... | B65G 51/02 104/138.1 |
| 4,149,684 A | * | 4/1979 | Warmann ............... | B65G 51/28 406/148 |
| 4,157,796 A | * | 6/1979 | Warmann ............... | B65G 51/28 406/31 |

(Continued)

OTHER PUBLICATIONS

PCT/US2020/027996, "Notification of Transmittal of the International Search Report and the Written Opinion of the International Searching Authority, or the Declaration", dated Jun. 17, 2020, pp. 1-16.

*Primary Examiner* — Joseph A Dillon, Jr.

(74) *Attorney, Agent, or Firm* — Kunzler Bean & Adamson

(57) ABSTRACT

A conduit access includes a base plate, a sensor, a motor, and a pivoting door plate. The base plate includes a pivot joint, a pass-through, and a stop. The pivot joint is at an edge of the base plate and extends toward a backside of the base plate. The pass-through is in a center of the base plate. The stop is on a rim of the base plate. The stop has a raised thickness on a frontside of the base plate. The sensor is in the pivot joint to detect motion. The motor is coupled to the pivot joint on the backside of the base plate. The motor activates on detection at the sensor. The pivoting door plate is parallel to the base plate. The pivoting door plate is coupled to the motor through the pivot joint to pivot across the frontside of the base plate to cover the pass-through.

7 Claims, 10 Drawing Sheets

(56) References Cited

U.S. PATENT DOCUMENTS

| | | | | |
|---|---|---|---|---|
| 4,189,259 | A * | 2/1980 | King | B65B 35/04 |
| | | | | 406/31 |
| 4,275,976 | A * | 6/1981 | Sticht | B65G 51/38 |
| | | | | 406/148 |
| 4,941,777 | A * | 7/1990 | Kieronski | B65G 1/06 |
| | | | | 406/110 |
| 5,215,412 | A * | 6/1993 | Rogoff | B65G 51/34 |
| | | | | 406/112 |
| 5,242,059 | A * | 9/1993 | Low | B07C 5/362 |
| | | | | 198/370.12 |
| 5,504,967 | A | 4/1996 | Graham | |
| 5,836,336 | A * | 11/1998 | Warzecha | F16K 3/06 |
| | | | | 137/15.23 |
| 6,012,199 | A * | 1/2000 | Litomisky | A47L 9/2842 |
| | | | | 15/301 |
| 6,089,537 | A * | 7/2000 | Olmsted | F16K 3/10 |
| | | | | 251/129.11 |
| 6,691,981 | B1 * | 2/2004 | Hart | F16K 3/085 |
| | | | | 251/302 |
| 6,827,529 | B1 * | 12/2004 | Berge | F25C 5/20 |
| | | | | 406/28 |
| 7,146,677 | B2 * | 12/2006 | Litomisky | A47L 5/38 |
| | | | | 15/301 |
| D604,828 | S * | 11/2009 | Krohmer | D32/31 |
| 8,011,862 | B2 * | 9/2011 | Scott | B65G 51/20 |
| | | | | 406/84 |
| 10,005,626 | B2 * | 6/2018 | Henry | B65G 51/02 |
| 2001/0031176 | A1 * | 10/2001 | Rassman, Jr. | B65G 51/02 |
| | | | | 406/153 |
| 2004/0093682 | A1 | 5/2004 | Litomisky et al. | |
| 2008/0202393 | A1 * | 8/2008 | Elsen | F17D 1/088 |
| | | | | 110/101 CF |
| 2008/0224079 | A1 * | 9/2008 | Maruyama | F16K 1/2263 |
| | | | | 251/152 |
| 2008/0298906 | A1 * | 12/2008 | Scott | B65G 51/34 |
| | | | | 406/12 |
| 2009/0067934 | A1 | 3/2009 | Balko | |
| 2012/0251249 | A1 * | 10/2012 | Ungerechts | B65G 69/181 |
| | | | | 406/38 |
| 2017/0137234 | A1 | 5/2017 | Henry | |
| 2017/0138523 | A1 * | 5/2017 | Fulgosi | B65D 53/02 |
| 2017/0219157 | A1 * | 8/2017 | Ethirajan | H04W 4/70 |
| 2017/0348813 | A1 | 12/2017 | Hartness | |
| 2019/0210235 | A1 * | 7/2019 | Kamiyama | B26D 5/007 |
| 2020/0284465 | A1 * | 9/2020 | Van Dijk | F16L 29/02 |

* cited by examiner

CONDUIT ACCESS

CROSS-REFERENCES TO RELATED APPLICATIONS

This application claims the benefit of U.S. Provisional Patent Application No. 62/832,345 entitled "CONDUIT ACCESS" and filed on 11 Apr. 2019 for Drew Henry, the entire contents of which are incorporated herein by reference for all purposes. This application further incorporates by reference the entire contents of U.S. patent application Ser. No. 15/356,318 entitled "VACUUM LAUNDRY CHUTE SYSTEM."

FIELD

This invention relates to access systems and more specifically to conduit access.

BACKGROUND

Providing access to a conduit usually involves an end to close the conduit. Many different types of hinged, latched, knobbed, threaded, or adhered ends may be used. Access to the conduit may be necessary for use of the conduit, maintenance, inspection, or the like.

SUMMARY

A conduit access is disclosed. The conduit access includes a base plate, a sensor, a motor, and a pivoting door plate. The base plate includes a pivot joint, a pass-through, and a stop. The pivot joint is at an edge of the base plate and extends toward a backside of the base plate. The pass-through is in a center of the base plate. The stop is on a rim of the base plate. The stop has a raised thickness on a frontside of the base plate. The sensor is in the pivot joint to detect motion. The motor is coupled to the pivot joint on the backside of the base plate. The motor activates on detection at the sensor. The pivoting door plate is parallel to the base plate. The pivoting door plate is coupled to the motor through the pivot joint to pivot across the frontside of the base plate to cover the pass-through.

A system is disclosed. The system includes a vacuum system, a chute, and a conduit access. The chute is coupled to the vacuum at one end of the chute. The conduit access is coupled to another end of the chute. The conduit access includes a base plate and a pivoting door plate. The base plate includes a pivot joint, a pass-through, and a stop. The pivot joint is disposed at an edge of the base plate and extending toward a backside of the base plate. The pass-through is disposed in a center of the base plate. The stop is disposed on a rim of the base plate alongside the pass-through. The stop has a thickness raised from a frontside of the base plate. The pivoting door plate is positioned parallel to the base plate. The pivoting door plate is coupled to the base plate at the pivot joint to pivot the pivoting door plate about the pivot joint and across the frontside of the base plate to cover the pass-through of the base plate.

A method is disclosed. The method includes pivoting a pivoting door plate about a pivot joint of a base plate to move the pivoting door plate parallel to, and across a front side of, the base plate to expose a pass-through disposed in a center of the base plate. The method also includes receiving an object at the pass-through of the base plate. The method also includes pivoting the pivoting door plate about the pivot joint to close the pass-through of the base plate to align a stop notch of the pivoting door plate with a stop feature of the base plate.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Figure 1:
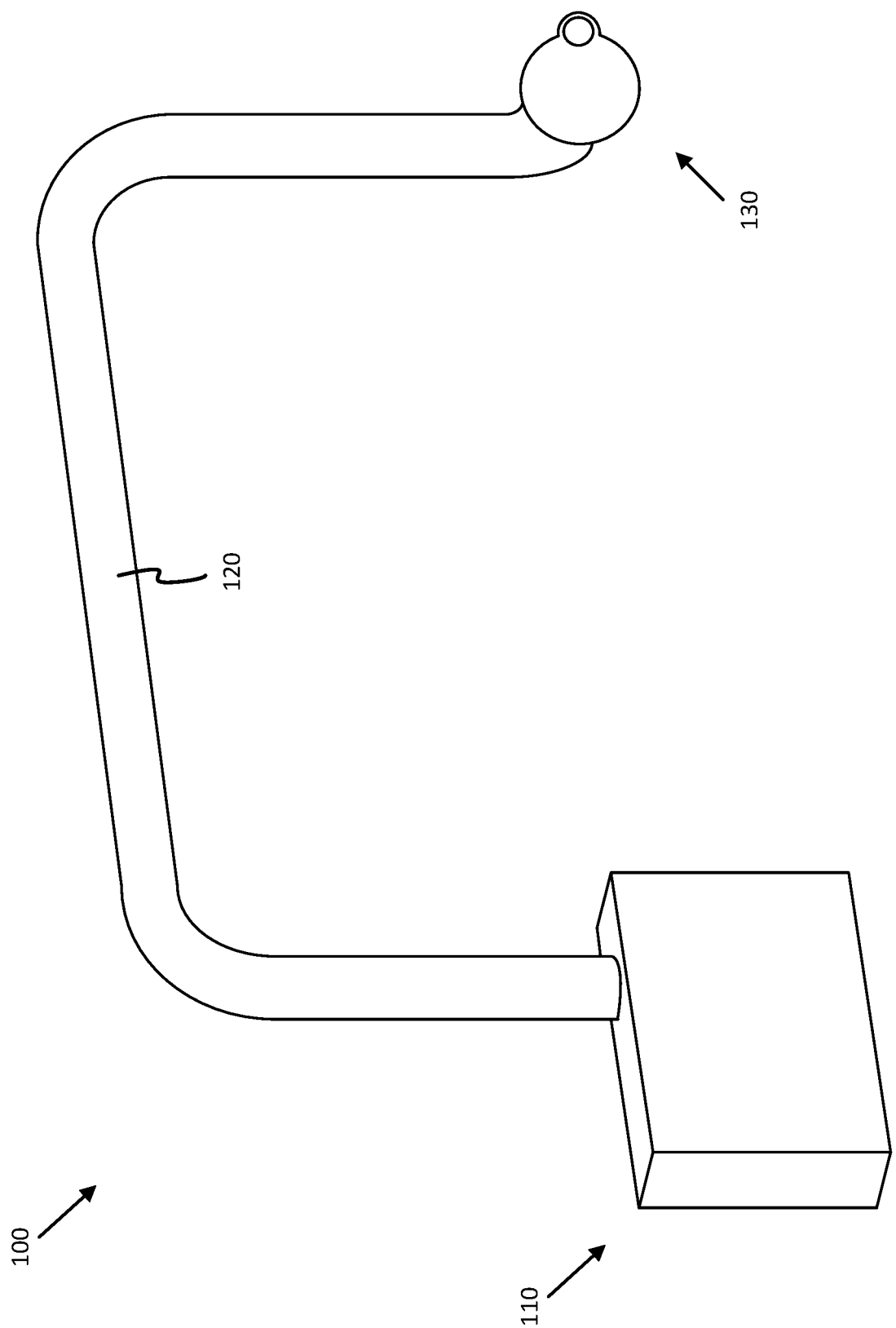
FIG. 1 is a perspective view illustrating one embodiment of a vacuum laundry chute system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In the above description, certain terms may be used such as "up," "down," "upper," "lower," "horizontal," "vertical," "left," "right," and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of" or "one or more", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a vacuum chute system 100. The system 100 may include a receptacle 110, at least one chute 120, and/or at least one conduit access 130. The system 100 may be built into a structure. In one embodiment, the structure may include a house. In one embodiment, the structure may include an apartment building, other multi-family dwelling, or the like. The receptacle 110 may be located in or near a specific area of facility of the structure such as a laundry room, mail delivery location, or the like. The chute 120 may be built into one or more walls of the structure. The conduit access 130 may be proximity sensitive and may be built into a room of the structure. For example, in one embodiment, a structure may include a conduit access 130 built into the wall of a bedroom. In one embodiment, the system 100 may be built into the structure during construction of the structure. In one embodiment, the system 100 may be retrofitted into the structure after construction of the structure.

In one embodiment, the system 100 may include at least one chute 120. In one embodiment, the chute 120 may include a length of material that includes a channel. The material surrounding the channel may include a thickness of any size. One or more cables, electrical lines, or the like may couple to the one or more chutes 120. For example, the one or more cables, electrical lines, or the like may run through the channel, through the material surrounding the channel, or the like. In one embodiment, the one or more cables, electrical lines, or the like may couple to the exterior of the chute 120 and run along the exterior of the chute 120. In one embodiment, the channel of the chute 120 includes a diameter of 6 inches (approx. 15.24 cm). In one embodiment, the diameter is more than 6 inches. In one embodiment, the diameter is fewer than 6 inches. In certain embodiments, the diameter may be small enough to prevent objects larger than intended from being inserted into the chute 120. The chute 120 may be of any length. In some embodiments, an end of the chute 120 includes a diameter smaller than an intermediate diameter of the chute 120. In one embodiment, an end of the chute 120 may include a diameter larger than an intermediate diameter of the chute 120. In certain embodiments, the chute 120 may include one or more curves, bends, or the like. The curves, bends, or the like may include a curve, bend, or the like at any angle.

In one embodiment, a chute 120 includes a plurality of chute segments. The chute segments may couple together in a variety of ways. In one embodiment, the chute segments may glue together. A clamp may couple the chute segments together. In one embodiment, an end of a chute segment may include a flange. The flange of a first chute segment may couple to an end of a second chute segment. In a further embodiment, the flange of the first chute segment may couple to a flange of the end of the second chute segment. One of skill in the art will recognize other ways that a first chute segment may couple to a second chute segment.

In one embodiment, the system 100 may include a plurality of chutes 120. The plurality of chutes 120 may include a central chute and one or more secondary chutes. In one embodiment, a first end of each secondary chute 120 of the plurality of chutes 120 may couple to the central chute 120 and the second end of each secondary chute 120 may couple to a conduit access 130. In certain embodiments, one end of the central chute 120 may couple to the receptacle 110. In certain embodiments, a first secondary chute 120 may couple to a second secondary chute 120. The second secondary chute 120 may couple to the central chute 120. The system 100 may include a plurality of central chutes 120.

Figure 2:
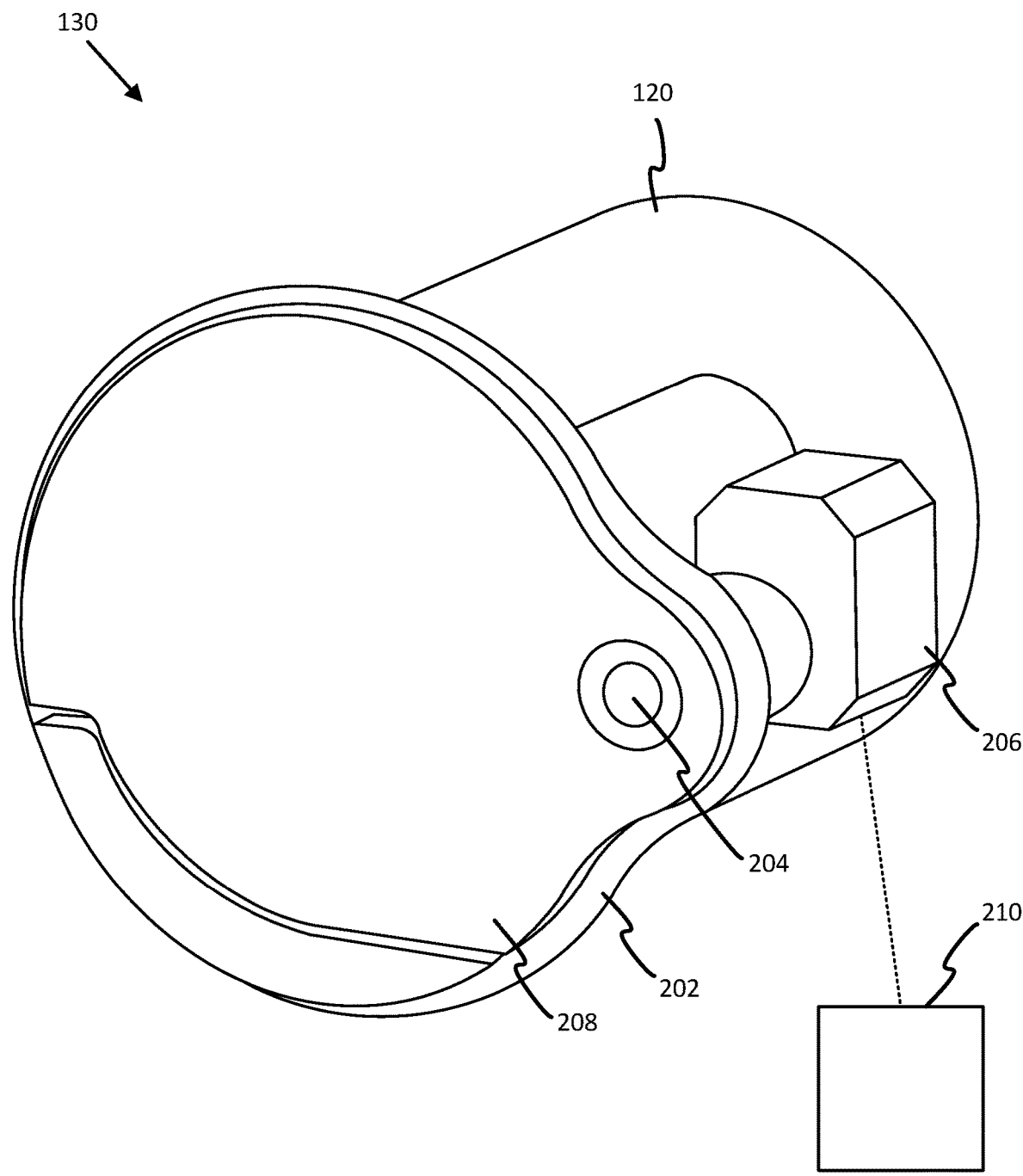
FIG. 2 is a perspective view illustrating one embodiment of a conduit access.

FIG. 2 is a perspective view illustrating one embodiment of a conduit access 130. In some embodiments, the conduit access 130 (hereinafter "access 130") is configured to be installed flush or approximately flush in a wall of a residence, facility, or other building. In some embodiments, the access 130 has a total in-wall depth compatible with a wall thickness of six and one-half inches. The access 130 may be configured to fit walls that are thinner or thicker than six and one-half inches.

In some embodiments, the access 130 may be a component in a network with a plurality of other accesses 130 of devices. For example, the access 130 may be networked with six or more accesses or other devices. The access 130 may be coupled to a controller, a negative pressure supply, or another device.

The illustrated embodiment of the access 130 includes a base plate 202, a sensor 204, a motor 206, and a pivoting door plate 208. The sensor 204 is positioned to detect motion, proximity, or other triggers on a frontside of the base plate 202. In some embodiments, the sensor 204 detects a proximity of an object at the sensor 204. In response to detection of the proximity of the object at the sensor 204, the sensor 204 may generate a signal. The sensor 204 may be capacitive, displacement capacitive, doppler effect, hall-effect, eddy-current, inductive, magnetic, optical, fiber optic, photoelectric, reflective, thermal, infrared, sonic, ultrasonic, radar, or the like. Additionally, the sensor 204 be overridden or replaced. For example, the sensor 204 may include or be replaced by a card reader, push button, electric key lock, biometric scanner, audio receiver, remote control, or the like.

The motor 206 is positioned on a backside of the base plate 202. The motor 206 is coupled, and applies a driving force, to the pivoting door plate 208 to rotate the pivoting door plate 208 relative to the base plate 202. In the illustrated embodiment, the motor 206 is aligned with the sensor 204 such that the pivoting door plate 208 rotates about the sensor 204. The motor 206 may be coupled to or free from the conduit 120. The motor 206 may be a stepper motor, a servo, a solenoid, an electric drive motor (such as an AC or DC motor in a brushed or brushless arrangement), a direct drive motor, a linear motor, or the like.

In some embodiments, the motor 206 is directly connected to the base plate 202 at a pivot joint. In other embodiments, the motor 206 is indirectly coupled to sensor 204. For example, at least one of the motor 206 and the sensor 204 may be coupled to control circuitry, module, board, logic, or the like. The motor 206 may include a mechanical or non-mechanical position control such as a stop, guide, or the like.

In some embodiments, the pivoting door plate 208 is positioned parallel to the base plate 202. The pivoting door plate 208 may be coupled to the motor 206 to allow the motor to pivot the pivoting door plate 208 across a frontside of the base plate 202 to cover the base plate 202. In some embodiments, the pivoting door plate 208 has a similar geometry to the base plate 202. In some embodiments, the pivoting door plate 208 may be smaller than the base plate 202. A seal (not shown) may be disposed between the pivoting door plate 208 and the base plate 202. The seal may be coupled to the base plate 202 or the pivoting door plate 208. The seal may include a felt material, rubberized material, fabric, foam, or the like. In some embodiments, the seal may be compressible. The seal may be rigid, semi-rigid, or non-rigid.

The illustrated embodiment also includes a controller 210. The controller 210 may be coupled to at least one of the motor 206, the sensor 204, or another component of the access 130. The controller 210 may receive signals from the access 130. The controller 210 may also receive signals from the access 130. For example, the sensor 204 may detect a proximity of an object and generate a signal which is sent to the controller 210. The controller 210 may return a door open command to the motor 206 which activates the motor 206 to open the pivoting door plate 208. The controller 210 may also be configured to operate another component separate from the access 130 in response to the signal from the sensor 204. For example, the controller 210 may activate a vacuum system or other system associated with or independent from the access 130. In one embodiment, the controller 210 is configured to activate a vacuum system in response to a signal from the sensor 204. The motor 206 may be activated while the vacuum system is running. The controller 210 may maintain the pivoting door plate 208 open and the vacuum system active for a predetermined or detected amount of time. The controller 210 may deactivate the vacuum system in response to expiration of the amount of time or in response to another detection. Similarly, the controller 210 may activate the motor 206 to close the pivoting door plate 208.

Figure 3:
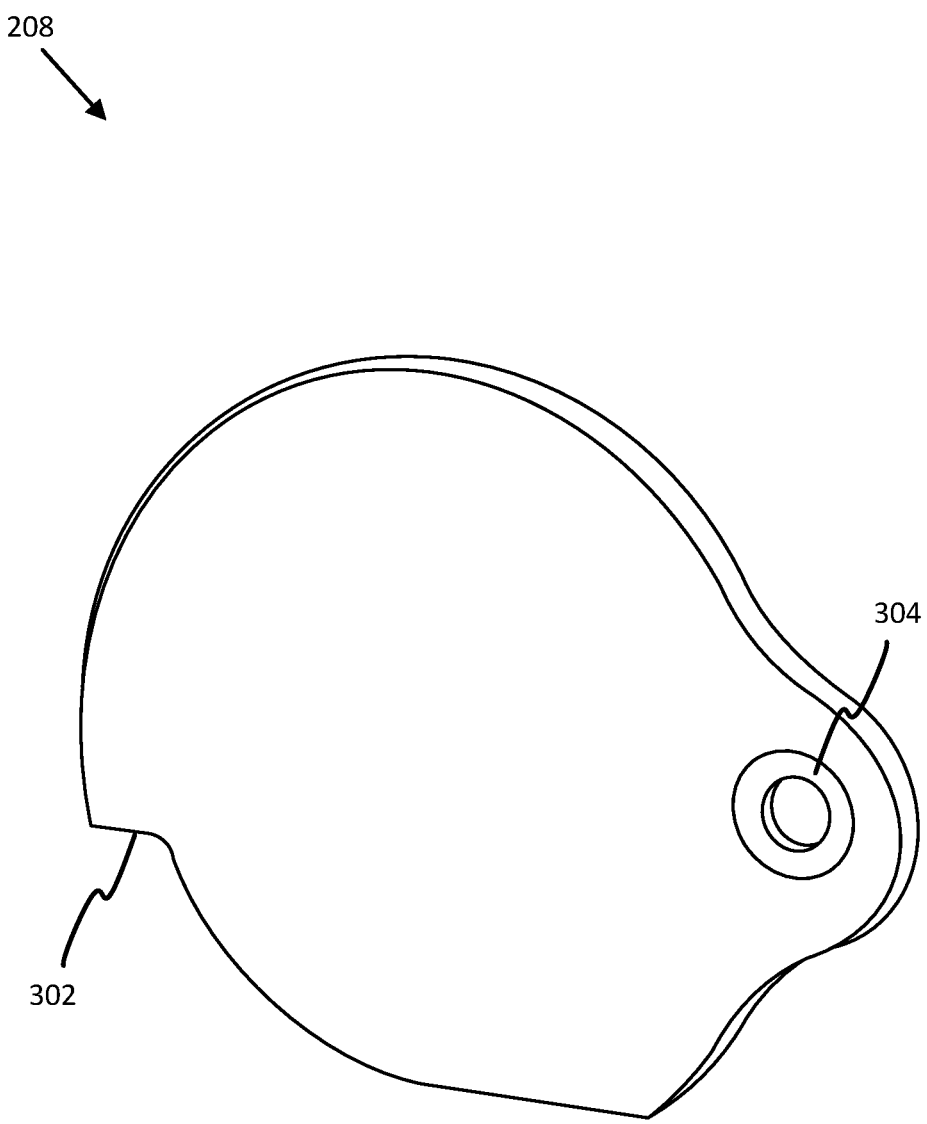
FIG. 3 is a perspective view illustrating one embodiment of a pivoting door plate of the conduit access of FIG. 2.

FIG. 3 is a perspective view illustrating one embodiment of a pivoting door plate 208 of the access 130 of FIG. 2. In the illustrated embodiment, the pivoting door plate 208 includes a stop notch 302. the stop notch 302 may correspond with a feature of the base plate 202 such as a stop feature (for example, stop feature 402 of FIG. 5). The stop notch 302 may include a magnet or other engagement feature to secure the stop notch 302 in a closed position relative to the base plate 202.

The illustrated embodiment also includes a pivot aperture 304. The pivot aperture 304 may align with a pivot joint (such as pivot joint 408 of FIGS. 5 and 7-9). In some embodiments, the pivot aperture 304 is a through-hole formed in the pivoting door plate 208. In the illustrated embodiment, the pivot aperture 304 is disposed to one side of the pivoting door plate 208. In other embodiments, the pivot aperture 304 may be disposed in other portions of the pivoting door plate 208.

The pivot aperture 304 may include a cover or other protective element (not shown) to prevent contact or damage to the sensor 204. In some embodiments, the pivot aperture 304 includes a threaded portion, a seal, lip, catch, or other structure which may facilitate alignment or engagement of the sensor 204 or other structure at or near the pivot aperture 304.

Figure 4:
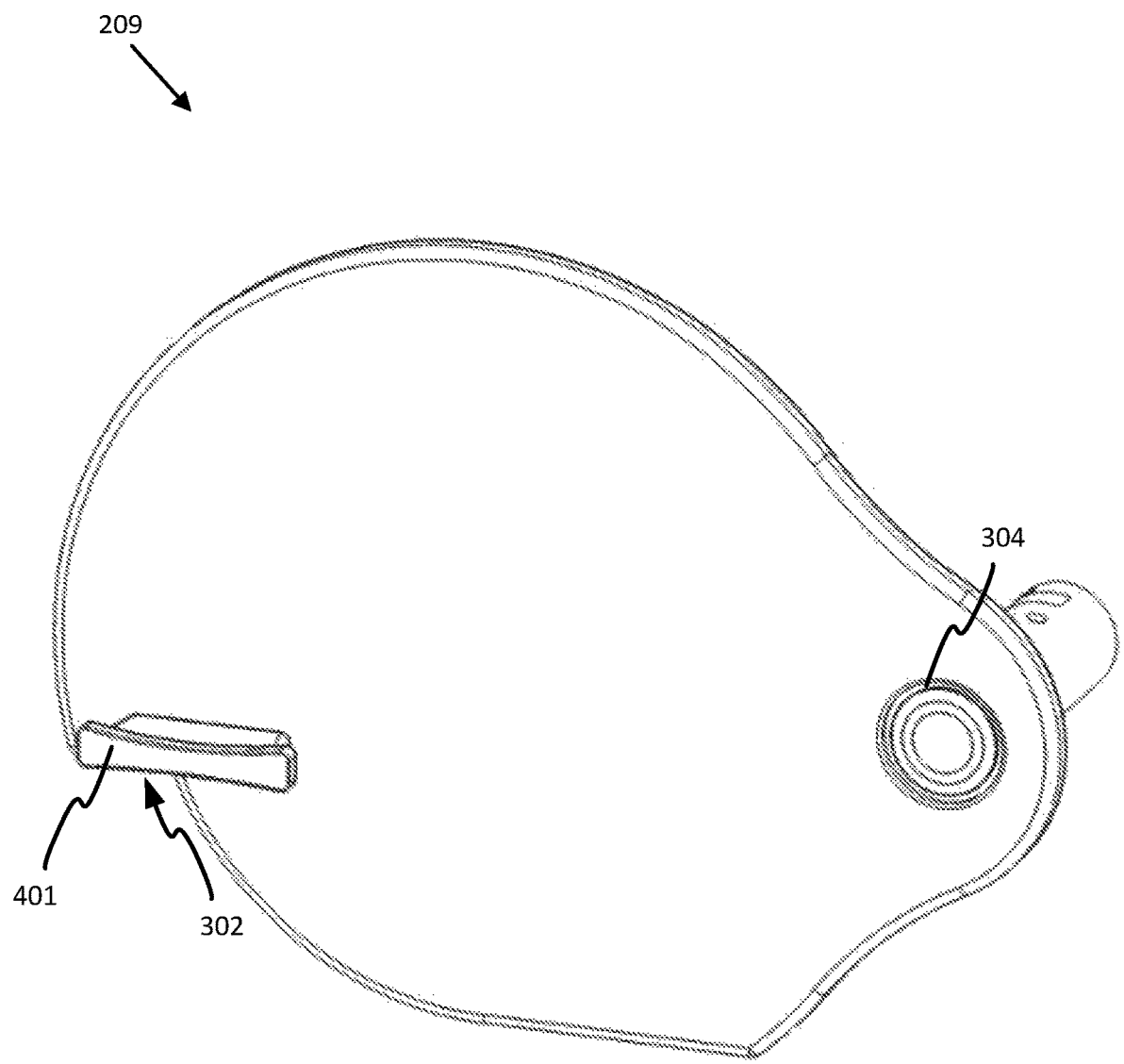
FIG. 4 is a perspective view illustrating one embodiment of a manual pivoting door plate.

FIG. 4 is a perspective view illustrating one embodiment of a manual pivoting door plate 209. In the illustrated embodiment, the manual pivoting door plate includes a manual interface 401. In some embodiments, the manual interface 401 is a portion or component of the manual pivoting door plate 209 which protrudes from the manual pivoting door plate 209 to form a structure allowing a user to grip, lift, press, or otherwise manually interact with the manual pivoting door plate 209 to move the manual pivoting door plate 209.

In some embodiments, the manual interface 401 is at least partially recessed into the manual pivoting door plate 209. The manual interface 401 may also at least partially protrude from the manual pivoting door plate 209. In the illustrated embodiment, the manual interface 401 is shown as positioned proximal the stop notch 302. In other embodiments, the manual interface 401 is positioned at other locations on the manual pivoting door plate 209. The manual interface 401 is shown as having an elongated geometry but may take other shapes and forms. Additionally, the manual interface 401 is shown as being oriented in a generally horizontal arrangement with the manual pivoting door plate 209 in the closed position, as shown. However, other embodiments may orient the manual interface 401 in other arrangements. In some embodiments, the manual interface 401 is positioned to provide sufficient torque to allow a user to open the manual pivoting door plate 209.

In the illustrated embodiment, the manual pivoting door plate 209 also includes the pivot aperture 304. In some embodiments, the pivot aperture 304, as implemented in the manual pivoting door plate 209 has some or all of the functionality of the pivot aperture 304 as described above with reference to FIG. 3. For example, the pivot aperture 304 may house one or more sensors or other components of a mechanical, electrical, magnetic, or similar nature. In some embodiments, the pivot aperture 304 allows for an indicator light or other status indictor to be visible to the user. In other embodiments, the pivot aperture 304 may include a cover, lens, button, or other element.

Figure 5:
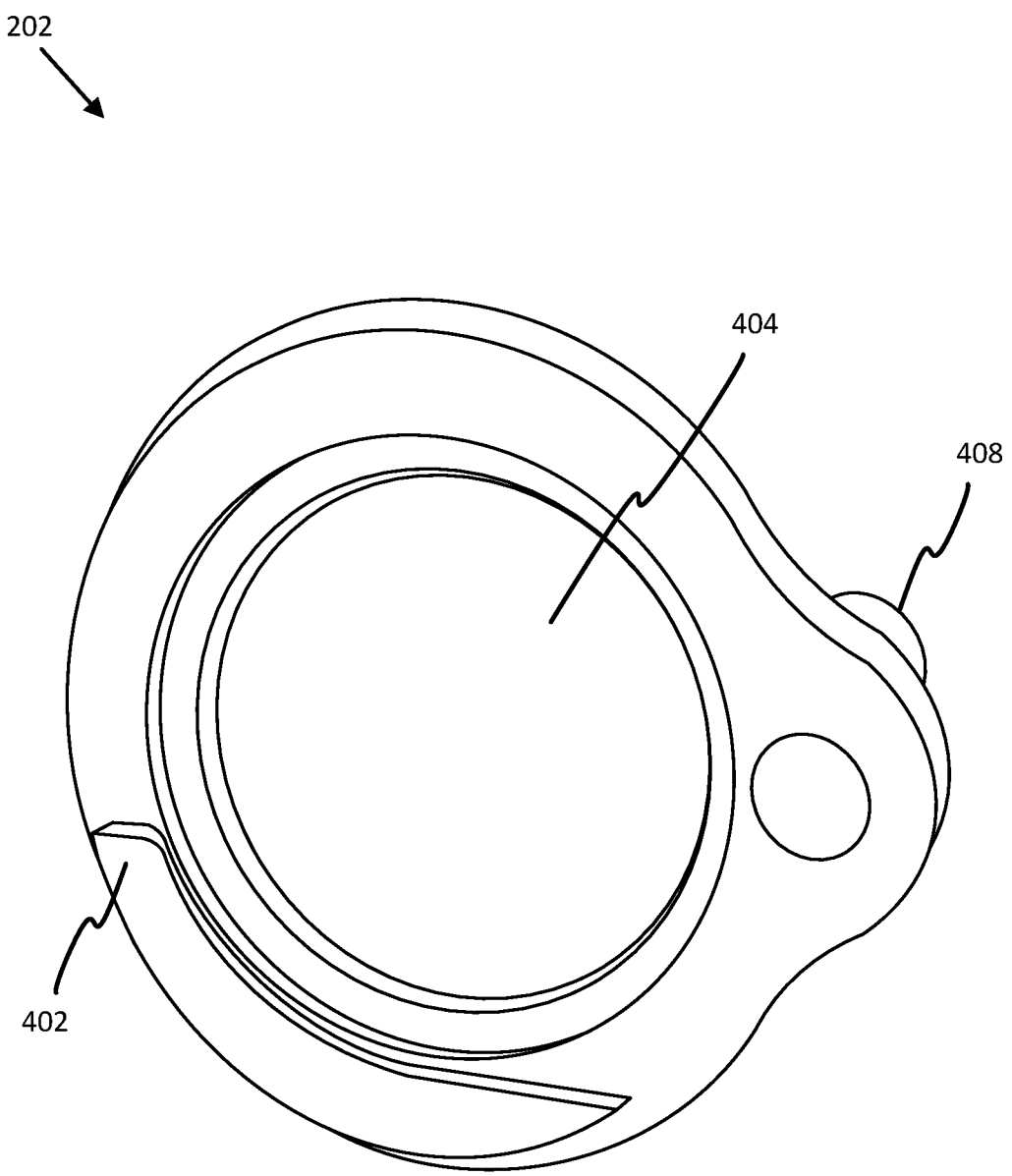
FIG. 5 is a perspective view illustrating one embodiment of a base plate of the conduit access of FIG. 2.

FIG. 5 is a perspective view illustrating one embodiment of a base plate 202 of the access 130 of FIG. 2. In the illustrated embodiment, the base plate 202 includes a stop feature 402. In the illustrated embodiment, the stop feature 402 is disposed along an edge of the base plate 202. In some embodiments, the stop feature 402 is positioned to correspond to the door plate 208. The stop feature 402 may provide a physical stop to receive or engage with the door plate 208. For example, the pivoting door plate 208 may rotate between an open position and a closed position. In the closed position, the pivoting door plate 208 may align with the base plate 202 and the stop notch 302 may contact or be in proximity of the stop feature 402. In some embodiments, the pivoting door plate 208 rotates about the pivot aperture 304 to an open position in which the pivoting door plate 208 exposes the base plate 202.

In the illustrated embodiment, the base plate 202 includes a pass-through 404. The pass-through 404 may be formed in a center of the base plate 202. The pass-through 404 may have a circular or non-circular geometry. In the illustrated embodiment, the pass-through 404 has a stepped perimeter. In other embodiments, the pass-through 404 may have a simple non-stepped perimeter. The perimeter of the pass-through 404 may have other shapes and treatments. For example, the perimeter of the pass-through 404 may have a chamfer, round, fillet, or the like. In some embodiments, a material, coating, structure, or other element may be included to increase wear, anti-snag, thermal insulation, electrical insulation, or other properties or characteristics of the base plate 202 at the pass-through 404. In some embodiments, the pivoting door plate 208 may rotate sufficiently to expose the entire pass-through 404 in the open position. In other embodiments, the pivoting door plate 208 may rotate to expose a portion of the pass-through 404 in the open position.

In the illustrated embodiment, the base plate 202 includes a pivot joint 408. The pivot joint 408 extends from the base plate 202 towards a backside of the base plate 202. In some embodiments, the pivot joint 408 is a monolithic extension of the base plate 202. In other embodiments, the pivot joint 408 is a separate component coupled to the base plate 202. For example, the pivot joint 408 may be coupled to the base plate 202 via welding, adhesives, bonding, mechanisms (such as screws, bolts, pins, locks, threads, or the like).

In some embodiments, the pivot joint 408 is a hollow structure. An interior of the pivot joint 408 may align with the pivot aperture 304 of the pivoting door plate 208. The relative positioning of the pivot joint 408 with the pivot aperture 304 may be coaxial. While both the pivot joint 408 and the pivot aperture 304 are shown as round or cylindrical, in some embodiments, the geometry of one or more of the pivot joint 408 and the pivot aperture 304 may be non-cylindrical. In some embodiments, the pivot joint 408 has an internal geometry matching an internal geometry of the pivot aperture 304. In other embodiments, the pivot joint 408 has an internal geometry that is different than an internal geometry of the pivot aperture 304.

Figure 6:
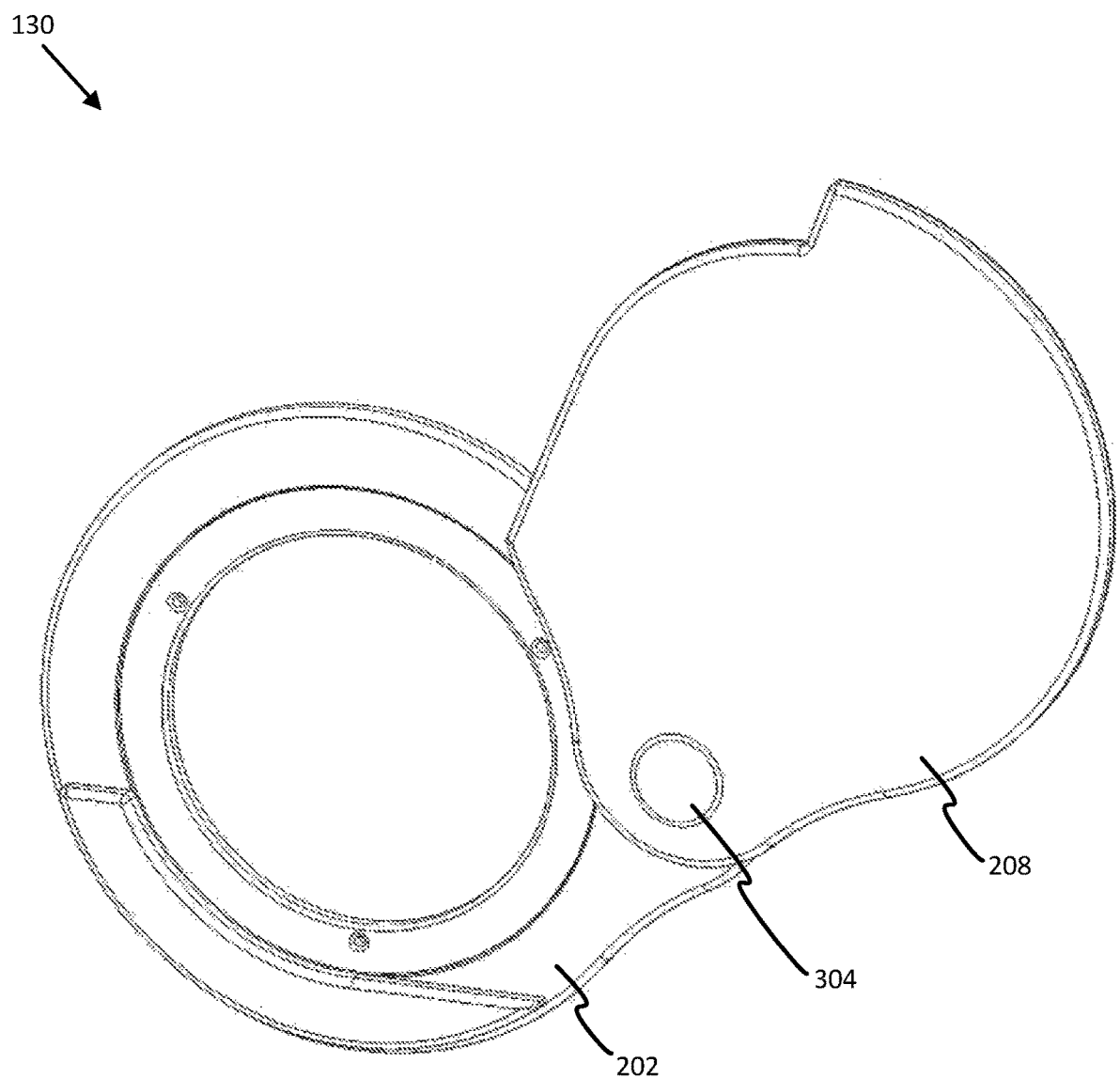
FIG. 6 is a perspective view illustrating one embodiment of the conduit access of FIG. 2 in an open position.

FIG. 6 is a perspective view illustrating one embodiment of the conduit access 130 of FIG. 2 in an open position. In the illustrated embodiment, the pivoting door plate 208 is pivoted about the pivot aperture 304 into the open position as shown. In the open position, the pivoting door plate 208 may allow access to the base plate 202 for installation, removal, or passage of an item or object through the base plate 202 and into the system 100 of FIG. 1. In some embodiment, the conduit access 130 applies at least one of a closure or opening force to the pivoting door plate 208 to maintain the pivoting door plate 208 in an open or closed position or to assist in opening or closing the pivoting door plate 208 relative to the base plate 202. The closure and/or opening force may be provided by an active or passive mechanism or combination of an active and passive mechanism.

Figure 7:
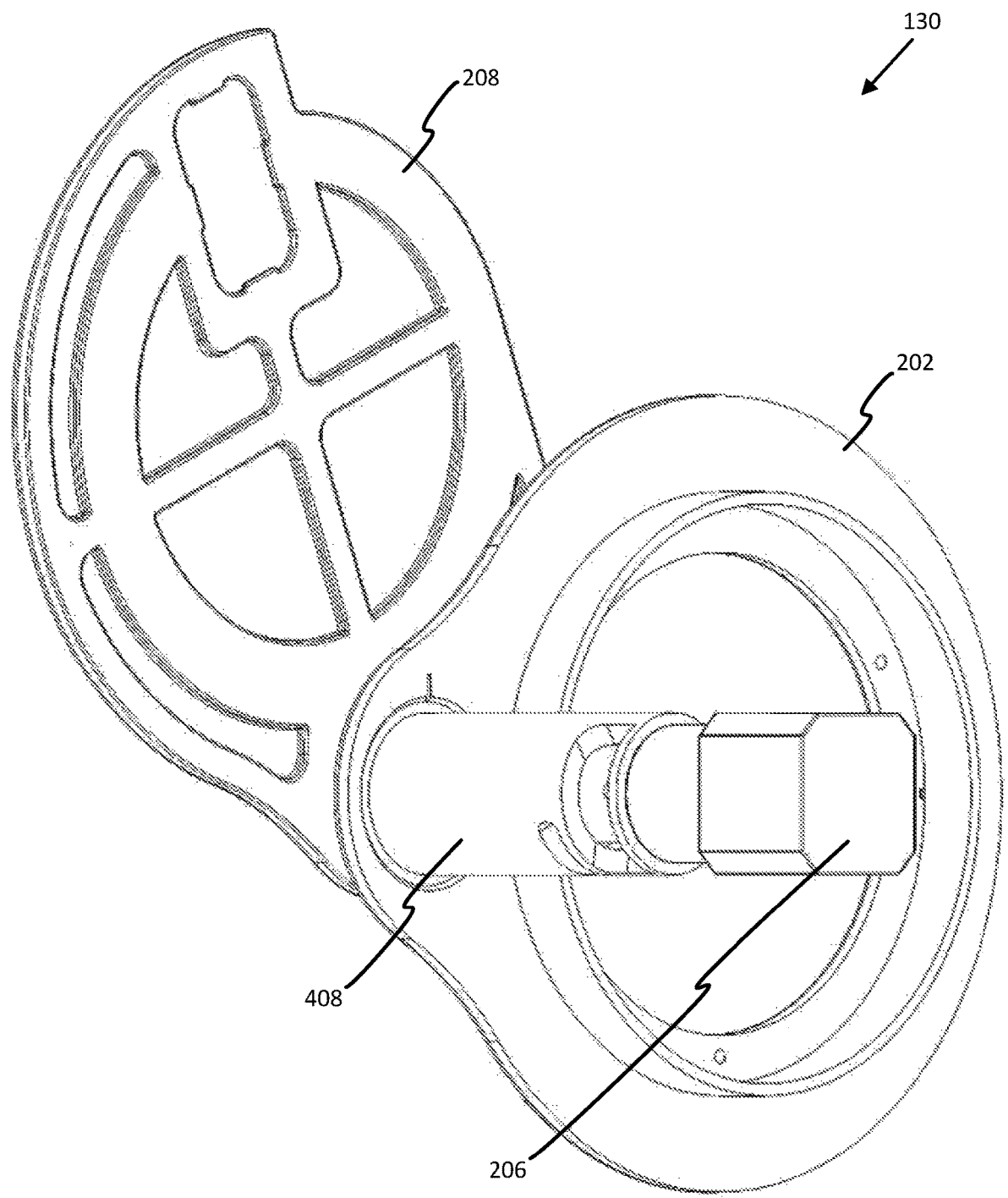
FIG. 7 is an alternative perspective view illustrating the conduit access of FIG. 6.

FIG. 7 is an alternative perspective view illustrating the conduit access 130 of FIG. 6. In the illustrated embodiment, the pivoting door plate 208 is shown in the open position. As shown, the pivoting door plate 208 may have a reinforced or skeletonized structure to provide structural support to the pivoting door plate 208 with weight and material savings. In the illustrated embodiment, the pivoting door plate 208 is pivoted about the pivot joint 408 to the open position. In some embodiments, the motor 206 moves the pivoting door plate 208 and/or maintains the pivoting door plate 206 in the open position. In other embodiments, the pivoting door plate 208 is a manual pivoting door plate (209 of FIG. 4) and the motor 206 may be omitted or replaced by a passive force component.

Figure 8:
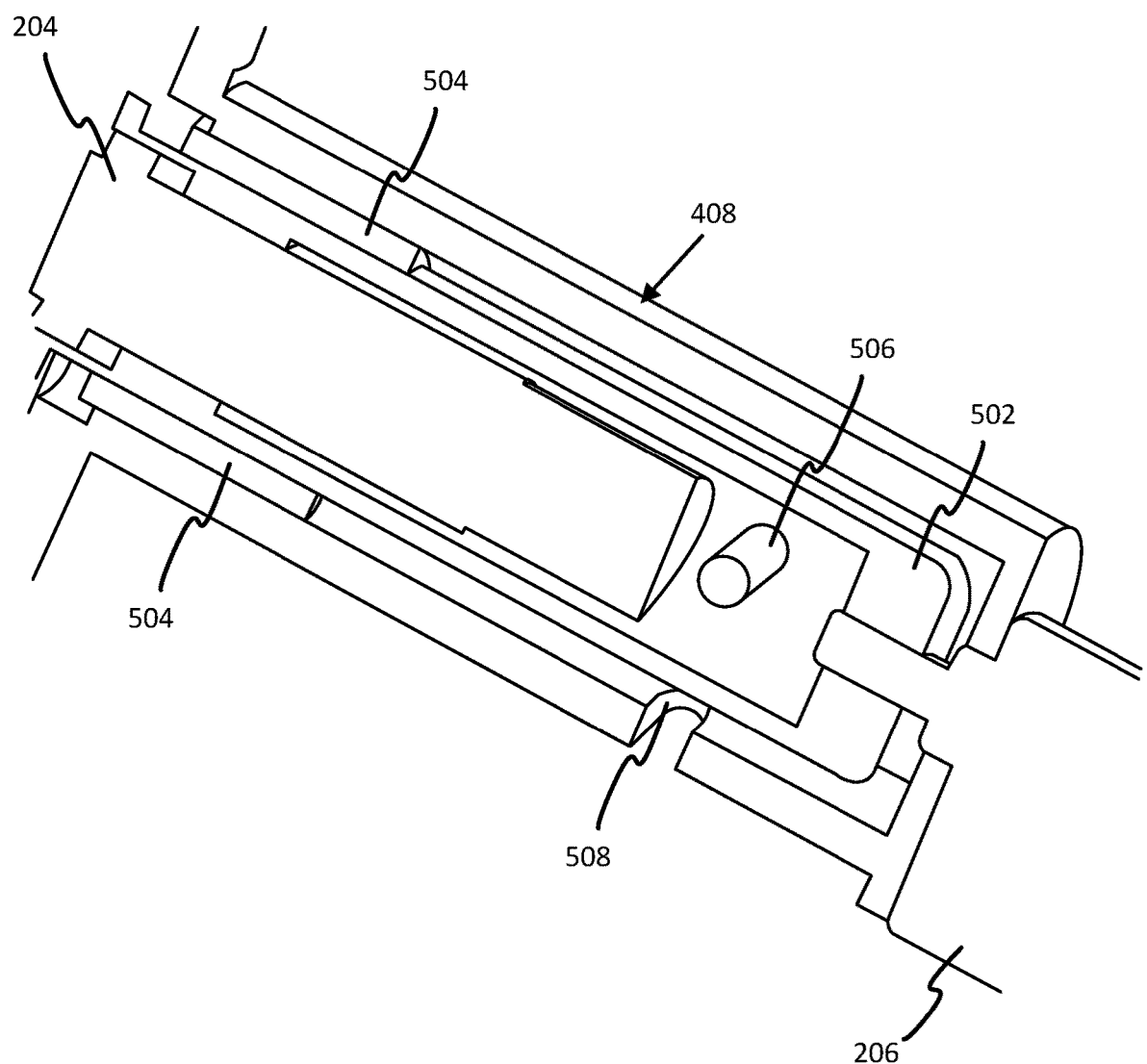
FIG. 8 is a cross-sectional view illustrating one embodiment of a portion of the conduit access at a pivot joint.

FIG. 8 is a cross-sectional view illustrating one embodiment of a portion of the access 130 at a pivot joint 408. The illustrated embodiment includes the sensor 204. In the illustrated embodiment, the sensor 204 is disposed centrally within the pivot joint 408. The sensor 204 may be configured to rotate with the pivoting door plate 208 or remain fixed relative to the base plate 202. In the illustrated embodiment, the sensor 204 has a cylindrical geometry. In other embodiments, the sensor 204 is non-cylindrical in geometry. the sensor 204 may include one or more electrical leads (not shown) to communicate a sensor signal from the sensor 204. In some embodiments, the sensor 204 may operate on a twelve-volt power supply. In some embodiments, the sensor 204 or other components of the access 130 may send or receive power, data, or other signals through wired, wireless, or a combination of wired and wireless connections.

In the illustrated embodiment, the sensor 204 is mounted within a drive shaft 502. The sensor 204 may be secured via one or more of threads, clips, pins, friction, adhesive, set screws, gaskets, retainers, or the like. The drive shaft 502 may have a cylindrical or non-cylindrical geometry. In the illustrated embodiment, the drive shaft 502 is hollow and the sensor 204 is disposed, at least partially, within the drive shaft 502. The drive shaft 502 may be coupled to the motor 206. In some embodiments, the drive shaft 502 rotates in response to activation of the motor 206. The drive shaft 502 may be removably or permanently coupled to the motor 206.

The illustrated embodiment also includes a bearing 504. In some embodiments, the bearing 504 is positioned within the pivot joint 408 to support the drive shaft 502 within the pivot joint 408. The bearing 504 may be a needle bearing, a journal bearing, a ball bearing, or the like. In the illustrated embodiment, the bearing 504 extends along a portion of the pivot joint 408. In other embodiments, the bearing 504 extends along more or less of the pivot joint 408.

In the illustrated embodiment, the drive shaft 502 also includes a stop 506. In some embodiments, the stop 506 forms a physical structure positioned to interact with the pivot joint 408 to limit the rotation of the drive shaft 502 relative to the pivot joint 408. In some embodiments, the stop 506 is a post that extends from the drive shaft 502 and aligns with a stop track 508. In some embodiments, the stop track 508 is a slot or hollow formed in a portion of the pivot joint 408. The stop track 508 may have a length corresponding to a movement pattern of the pivoting door plate 208 relative to the base plate 202. For example, the length of the stop track 508 may correspond to a degree of rotation of the pivoting door plate 208. In some embodiments, the degree of rotation of the pivoting door plate 208 is approximately ninety degrees.

In some embodiments, the motor 206 is configured to detect one or more inputs. For example, the motor 206 may detect that the stop 506 has reached an end of the stop track 508, when an obstruction is in the path of the pivoting door plate 208, when a start or stop condition occurs, and the like. One or more of the sensor 204 or the motor 206 may be configured to display a status of the access 130 on a light, sign, or other display apparatus.

Figure 9:
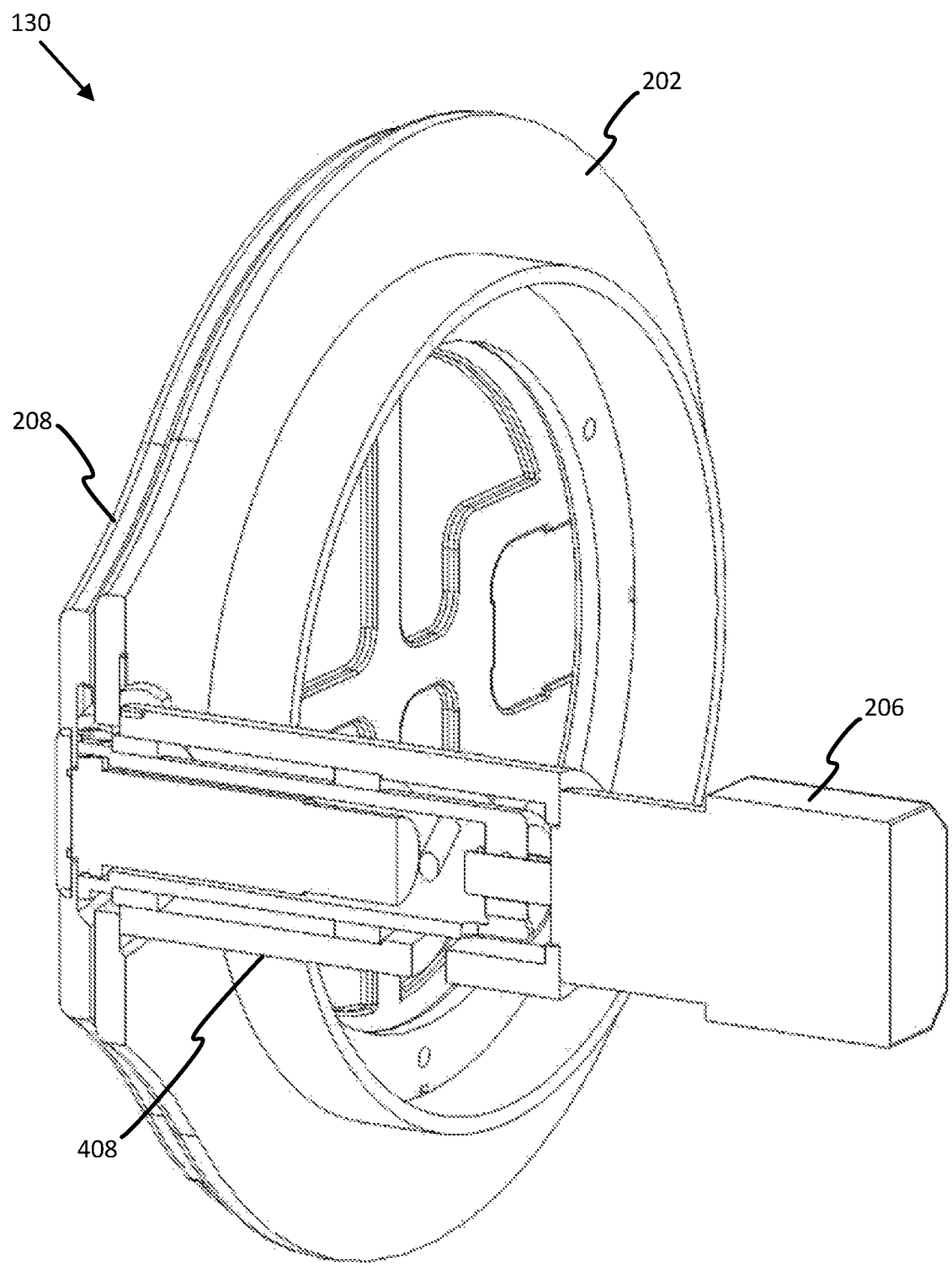
FIG. 9 is a partial cross-sectional view illustrating one embodiment of the conduit access with a cross-section of the pivot joint.

FIG. 9 is a partial cross-sectional view illustrating one embodiment of the conduit access 130 with a cross-section of the pivot joint 408. In the illustrated embodiment, the pivoting door plate 208 is in the close position relative to the base plate 202. As shown, the pivoting door plate 208 may be coupled to the pivot joint 408 to allow the motor 206 to apply a force to the pivoting door plate to open or close the pivoting door plate 208 or maintain the pivoting door plate 208 in an open or closed position.

Figure 10:
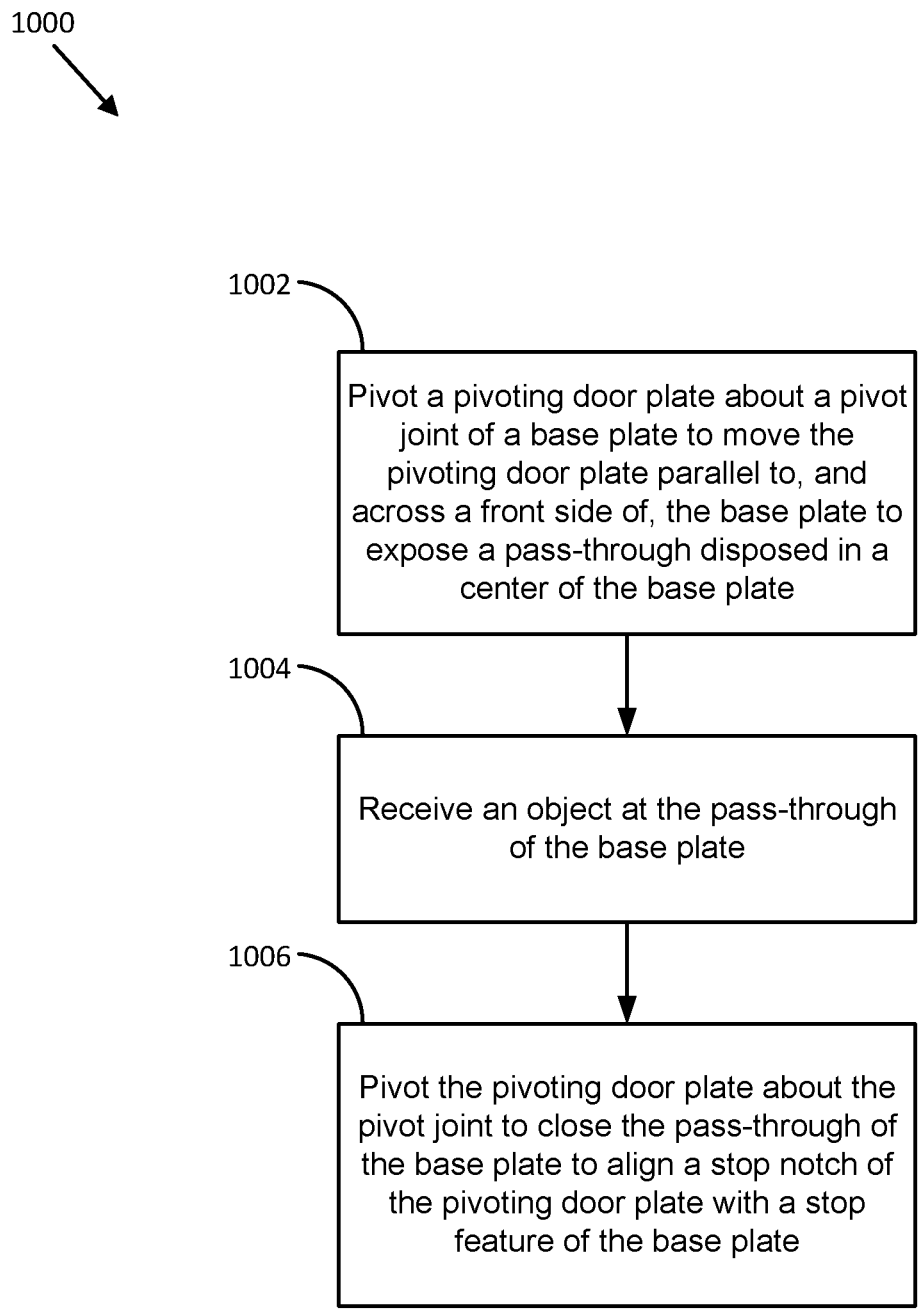
FIG. 10 is a flow diagram illustrating one embodiment of a method.

FIG. 10 is a flow diagram illustrating one embodiment of a method 1000. The method 1000 includes, at block 1002, pivoting a pivoting door plate about a pivot joint of a base plate to move the pivoting door plate parallel to, and across a front side of, the base plate to expose a pass-through disposed in a center of the base plate.

At block 1004, the method 1000 includes receiving an object at the pass-through of the base plate. At block 1006, the method 1000 includes pivoting the pivoting door plate about the pivot joint to close the pass-through of the base plate to align a stop notch of the pivoting door plate with a stop feature of the base plate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A conduit access comprising:
    a base plate comprising:
        a pivot joint disposed at an edge of the base plate and extending toward a backside of the base plate;
        a pass-through disposed in a center of the base plate; and
        a stop disposed on a rim of the base plate alongside the pass-though, the stop having a thickness raised from a frontside of the base plate;
    a sensor disposed in the pivot joint to detect motion on the frontside of the base plate;
    a motor coupled to the pivot joint on the backside of the base plate, the motor to activate in response to a detection at the sensor;
    a pivoting door plate positioned parallel to the base plate, the pivoting door plate being coupled to the motor through the pivot joint to pivot the pivoting door plate about the pivot joint and across the frontside of the base plate to cover the pass-through of the base plate.

2. The conduit access of claim 1, wherein the base plate is configured to couple to a chute.

3. The conduit access of claim 1, wherein the pass-through in the baseplate is circular.

4. The conduit access of claim 1, wherein at least one of the sensor and the motor are in communication with a controller to at least one of receive and send signals with the at least one of the sensor and the motor.

5. The conduit access of claim 1, wherein at least one of the sensor and the motor are in communication with a vacuum system.

6. The conduit access of claim 1, wherein the sensor is disposed centrally within the pivot joint.

7. The conduit access of claim 1, further comprising a drive shaft coupling the motor to the pivoting door plate.

* * * * *